(12) United States Patent
Hwang

(10) Patent No.: US 9,906,416 B2
(45) Date of Patent: Feb. 27, 2018

(54) METHOD AND APPARATUS TO MANAGE SERVICE LEVEL AGREEMENT

(71) Applicant: S-PRINTING SOLUTION CO., LTD., Suwon-si, Gyeonggi-do (KR)

(72) Inventor: Ki-young Hwang, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 295 days.

(21) Appl. No.: 13/956,505

(22) Filed: Aug. 1, 2013

(65) Prior Publication Data

US 2014/0149584 A1 May 29, 2014

(30) Foreign Application Priority Data

Nov. 27, 2012 (KR) ........................ 10-2012-0135564

(51) Int. Cl.
*G06F 15/173* (2006.01)
*H04L 12/24* (2006.01)

(52) U.S. Cl.
CPC ...... *H04L 41/5003* (2013.01); *H04L 41/5009* (2013.01); *H04L 41/5025* (2013.01); *H04L 41/5045* (2013.01)

(58) Field of Classification Search
None
See application file for complete search history.

(56) References Cited

U.S. PATENT DOCUMENTS

| | | | |
|---|---|---|---|
| 5,893,905 A | 4/1999 | Main et al. | |
| 6,857,020 B1 * | 2/2005 | Chaar et al. | 709/226 |
| 6,912,568 B1 * | 6/2005 | Nishiki et al. | 709/223 |
| 6,996,728 B2 | 2/2006 | Singh | |
| 7,222,245 B2 | 5/2007 | Singh | |
| 7,349,960 B1 * | 3/2008 | Pothier et al. | 709/224 |
| 7,467,192 B1 | 12/2008 | Lemler et al. | |
| 7,583,607 B2 | 9/2009 | Steele et al. | |
| 7,600,007 B1 * | 10/2009 | Lewis | G06Q 10/04 709/223 |
| 7,672,923 B1 | 3/2010 | Reed | |
| 7,962,916 B2 | 6/2011 | Ramanathan | |
| 8,893,009 B2 * | 11/2014 | Raleigh et al. | 715/736 |
| 2003/0187828 A1 * | 10/2003 | Bauchot et al. | 707/1 |
| 2004/0062205 A1 * | 4/2004 | Friskney et al. | 370/252 |
| 2004/0174823 A1 * | 9/2004 | Steele | H04L 41/5003 370/252 |
| 2009/0157441 A1 | 6/2009 | Curry | |

(Continued)

OTHER PUBLICATIONS

European Search Report dated Feb. 20, 2014 issued in EP Application No. 13176748.5.

*Primary Examiner* — Joseph E Avellino
*Assistant Examiner* — Phyllis A Book
(74) *Attorney, Agent, or Firm* — Staas & Halsey LLP

(57) ABSTRACT

A method of managing a service level agreement (SLA) with respect to devices on a network by using a server includes selecting at least one SLA item to quantitatively measure service levels provided by the devices, setting a service management automatic option with respect to the selected SLA item, monitoring the service levels provided by the devices with respect to the selected SLA item, and executing a predetermined event to control the devices according to a result of the monitoring and a setting of the service management automatic option.

19 Claims, 14 Drawing Sheets

(56) References Cited

U.S. PATENT DOCUMENTS

| | | | |
|---|---|---|---|
| 2010/0080129 A1* | 4/2010 | Strahan | H04L 41/12 370/242 |
| 2010/0223217 A1 | 9/2010 | Little | |
| 2010/0299153 A1* | 11/2010 | Curtis et al. | 705/1.1 |
| 2012/0011517 A1 | 1/2012 | Smith et al. | |
| 2012/0016706 A1* | 1/2012 | Pargaonkar et al. | 705/7.11 |
| 2013/0132337 A1* | 5/2013 | Masuda | G06F 17/30002 707/609 |
| 2013/0185461 A1* | 7/2013 | Narita | G06F 11/3051 710/15 |
| 2013/0218791 A1* | 8/2013 | Ogawa | G06Q 10/00 705/318 |

\* cited by examiner

FIG. 14

METHOD AND APPARATUS TO MANAGE SERVICE LEVEL AGREEMENT

CROSS-REFERENCE TO RELATED APPLICATIONS

This application claims priority under 35 U.S.C. § 119(a) from Korean Patent Application No. 10-2012-0135564, filed on Nov. 27, 2012, in the Korean Intellectual Property Office, the disclosure of which is incorporated herein in its entirety by reference.

BACKGROUND OF THE INVENTION

1. Field of the Invention

The present general inventive concept relates to a method and apparatus to manage a service level agreement (SLA) through a network.

2. Description of the Related Art

A service vendor promises to provide a customer with a service over a level negotiated through a service quality contract, which is referred to as service level agreement (SLA). The service vendor evaluates a service level while periodically monitoring the performance of a product that the service vendor sold. When it is determined that a current service level does not satisfy the SLA, the service vendor is requested to take necessary maintenance action with respect to a service item having a problem.

A service level management (SLM) system to efficiently perform SLA management has been studied. In a current SLM system, a service level provided by sold products is monitored through a network and a result of the monitoring is statistically analyzed, thereby automatically generating a service level report. The service vendor finds any problems or errors in service items through the service level report and takes necessary action. According to the current SLM system, since the service vendor passively recognizes a problem and then takes necessary action, there is no immediate response to the problem. Also, when a new SLA item is added or deleted after a contract is made, a change of SLA items is not reflected in SLA management software that is installed on the SLM system. Thus, the changed SLA item is manually managed until new SLA management software capable of monitoring the changed SLA items is developed.

Accordingly, there is no conventional method of automatically managing the errors and/or problems associated with SLA items.

SUMMARY OF THE INVENTION

The present general inventive concept provides a method and apparatus that may automate service level agreement (SLA) management, may automatically take any necessary action on an SLA item having an error to efficiently and quickly fix the error, and may improve a service level.

The present general inventive concept also provides a method and apparatus to dynamically manage changes of SLA items.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a method of managing a service level agreement (SLA) with respect to devices on a network by using a server includes selecting at least one SLA item to quantitatively measure service levels provided by the devices, setting a service management automatic option with respect to the selected SLA item, monitoring the service levels provided by the devices with respect to the selected SLA item, and executing a predetermined event to control the devices according to a result of the monitoring and a setting of the service management automatic option.

The monitoring of the service levels may include receiving a normal operation time of each device and an error fix time consumed to fix an error occurring on the selected SLA item, and calculating an average operation rate of the devices based on the normal operation time and the error fix time.

The monitoring of the service levels may include receiving error type information indicating cause of an error occurring on the devices, and the executing of a predetermined event comprises executing an event corresponding to the error type information by referring to an error management policy that is previously stored in the server.

The method may further include setting a target service level with respect to the selected SLA item based on input by a user.

In the monitoring of the service levels, the monitoring result and the set target service level may be compared with each other and the selected SLA item may be indicated to be in a warning state or normal state.

The method may further include obtaining SLA extended data to add a new SLA item to the SLA items, and installing the SLA extended data on the server.

The installing of the SLA extended data may include parsing a predetermined extensible markup language (XML) file included in the SLA extended data, determining whether the new SLA item is to be added to the existing SLA items based on the parsed predetermined XML file, and installing the SLA extended data according to a result of the determination.

The service management automatic option may include an automatic management mode in which the server automatically controls the devices, a semiautomatic management mode in which the server controls the devices only when the monitoring result does not satisfy a predetermined service level, and a manual management mode in which the devices are controlled in accordance with a command by a user, and the SLA items may include at least one of a device firmware management item, a device driver management item, a device consumables management item, and a server software management item, the software being installed on the server.

In the executing of the event, at least one of a device firmware update event, a device driver update event, a device rebooting event, and a server software update event, the software being installed on the server may be executed.

The selecting of at least one SLA item may include when a user requests registration of an SLA item, receiving an input of a representative name and summary information of the SLA item to be registered, via a graphic user interface (GUI), receiving a selection of at least one of the devices to which the SLA item to be registered is applied, and outputting a list of the SLA items and receiving a selection of the SLA item to be registered from the list.

The foregoing and/or other features and utilities of the present general inventive concept may also be achieved by providing a non-transitory computer-readable recording medium having recorded thereon a program to execute the above method.

The foregoing and/or other features and utilities of the present general inventive concept may also be achieved by providing a server for managing a service level agreement (SLA) with respect to devices on a network includes a network interface to connect to the network, a user interface to receive a selection of at least one SLA item to quantitatively measure service levels provided by the devices and to receive inputs of a target service level with respect to the selected SLA item and a setting of a service management automatic option, and a control unit to monitor the service levels provided by the devices with respect to the selected SLA item and to execute a predetermined event to control the devices according to a result of the monitoring and the setting of the service management automatic option.

The control unit may receive a normal operation time of each device and an error fix time consumed to fix an error occurring on the selected SLA item and may calculate an average operation rate of the devices based on the normal operation time and the error fix time.

When an error occurs on the devices, the control unit may receive error type information indicating cause of the error through the network interface and may execute an event corresponding to the error type information by referring to an error management policy that is previously stored in the server.

The control unit may compare the monitoring result and the target service level and indicates the selected SLA item to be in a warning state or normal state.

The service management automatic option may include an automatic management mode in which the server automatically controls the devices, a semiautomatic management mode in which the server controls the devices only when the monitoring result does not satisfy a predetermined service level, and a manual management mode in which the devices are controlled in accordance with a command by a user, and wherein the SLA items may include at least one of a device firmware management item, a device driver management item, a device consumables management item, and a server software management item, the software being installed on the server.

The control unit may obtain SLA extended data to add a new SLA item to the SLA items through the network interface or an external input port provided in the server, and comprises a bundle extension unit to install the SLA extended data on the server.

The bundle extension unit may include an extensible markup language (XML) parser to parse a predetermined XML file included in the SLA extended data and an installer to determine whether the new SLA item is to be added to the existing SLA items based on the parsed predetermined XML file and installing the SLA extended data according to a result of the determination.

The control unit may execute at least one of a device firmware update event, a device driver update event, a device rebooting event, and a server software update event, the software being installed on the server.

The user interface may receive an input of a representative name and summary information of an SLA item to be registered, via a graphic user interface (GUI), when a user requests registration of the SLA item, may receive a selection of at least one of the devices to which the SLA item to be registered is applied, may output a list of the SLA items, and may receive a selection of the SLA item to be registered from the list.

The foregoing and/or other features and utilities of the present general inventive concept may also be achieved by providing a server to manage a service level agreement (SLA) with respect to one or more devices on a network, the server including a network interface to connect to the network, and a control unit to monitor service levels provided by the devices with respect to at least one SLA item and to execute a predetermined event to control the devices according to a result of the monitoring based on a preset service management automatic option.

The preset service management automatic option may be one of an automatic management mode, a semiautomatic management mode, and a manual management mode.

When the preset service management automatic option is the semiautomatic management mode, the server may compare a predetermined service level and the monitoring result, and may either automatically perform the predetermined event when the service levels provided by the devices are lower than the predetermined service level, or may not perform the predetermined event until a user command is received when the service levels provided by the devices are equal to or higher than the predetermined service level.

The server may further include a user interface to display a plurality of SLA items, to allow a user to select the at least one SLA item from the plurality of SLA items to quantitatively measure the service levels provided by the devices, to allow a user to preset the service management automatic option, and to receive inputs of a target service level with respect to the at least one selected SLA item and the preset service management automatic option, and a storage unit to store an error management policy.

The control unit may further include a graphic user interface (GUI) generation unit to generate a GUI to be output through the user interface to allow a user to view the SLA items, a monitoring unit to monitor the service levels provided by the devices with respect to the selected SLA items through the user interface, and an event execution unit to execute the event by referring to the error management policy stored in the storage unit executes the event corresponding error type information.

The event execution unit may execute at least one of a device firmware update event, a device driver update event, a device rebooting event, and an SLA management software update event.

BRIEF DESCRIPTION OF THE DRAWINGS

The above and other features and utilities of the present general inventive concept will become more apparent and more readily appreciated from the following description of the exemplary embodiments, taken in conjunction with the accompanying drawings of which:

FIGS. 8 through 14 illustrate a GUI of the SLA management software, according to an exemplary embodiment of the present general inventive concept.

DETAILED DESCRIPTION OF THE PREFERRED EMBODIMENTS

Figure 1:
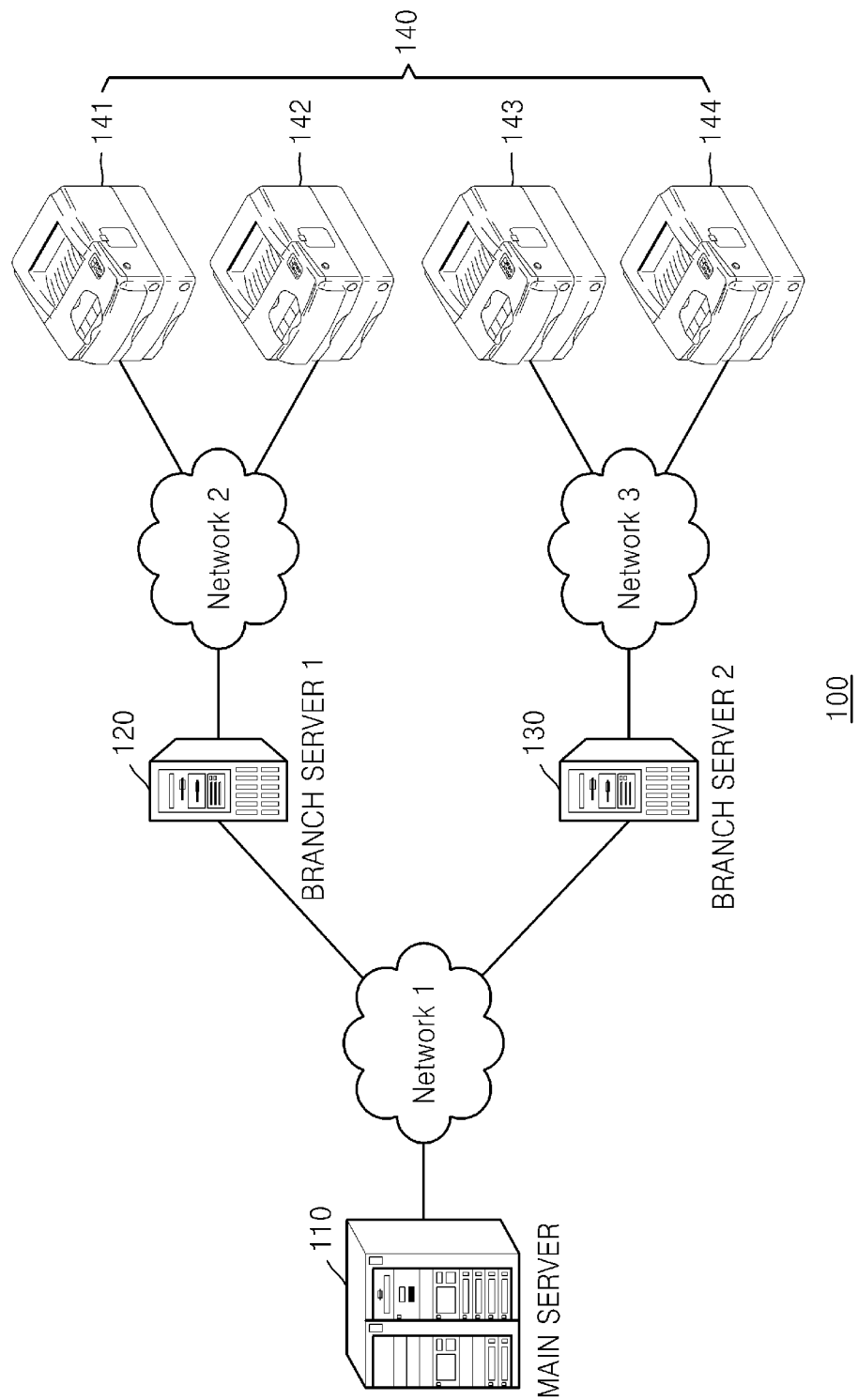
FIG. 1 is a view schematically illustrating a service level agreement (SLA) management system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

As used herein, the term "and/or" includes any and all combinations of one or more of the associated listed items. Expressions such as "at least one of," when preceding a list of elements, modify the entire list of elements and do not modify the individual elements of the list.

FIG. 1 is a view schematically illustrating a service level agreement (SLA) management system 100 according to an exemplary embodiment of the present general inventive concept. Referring to FIG. 1, the SLA management system 100 includes a main server 110, branch servers 120 and 130, and image forming apparatuses 140, specifically denoted as image forming apparatus 141, image forming apparatus 142, image forming apparatus 143, and image forming apparatus 144.

The main server 110 and the branch servers 120 and 130 control the image forming apparatuses 140 to manage service levels provided by the image forming apparatuses 140. Services provided by the image forming apparatuses 140 include print, scan, copy, and fax functions, but an SLA item is not limited thereto. For example, the management of firmware in each of the image forming apparatuses 140, a printer driver to drive each of the image forming apparatuses 140, and consumables such as toner or paper needed by the image forming apparatuses 140 may be SLA items. Since the main server 110 and the branch servers 120 and 130 manage an SLA through a computerized process, the SLA items related to software of the image forming apparatuses 140 may be major management targets.

As illustrated in FIG. 1, the image forming apparatuses 140 may be located at different locations. For example, the image forming apparatuses 141 and 142 and the image forming apparatuses 143 and 144 are located at different locations, namely network 2 and network 3, respectively. To manage the image forming apparatuses 140 by locations, the branch server 120 manages services of the image forming apparatuses 141 and 142 and the branch server 130 manages services of the image forming apparatuses 143 and 144.

The main server 110 and the branch servers 120 and 130 belong to hierarchically different classes. Since the main server 110 belongs to class that is higher than the branch servers 120 and 130, the main server 110 may manage the branch servers 120 and 130 and simultaneously manage services of all the image forming apparatuses 140. The management of the branch servers 120 and 130 may be included in an SLA item according to a contract. A service vendor may manage the branch servers 120 and 130 by using the main server 110. For example, the main server 110 may check a version of the SLA management software installed on the branch servers 120 and 130 and update the software to the latest version.

In the following description, it is assumed that an SLM server 600a or 600b, as illustrated in FIG. 6, denotes the main server 110 or the branch servers 120 and 130, and devices denote the image forming apparatuses 140.

Figure 2:
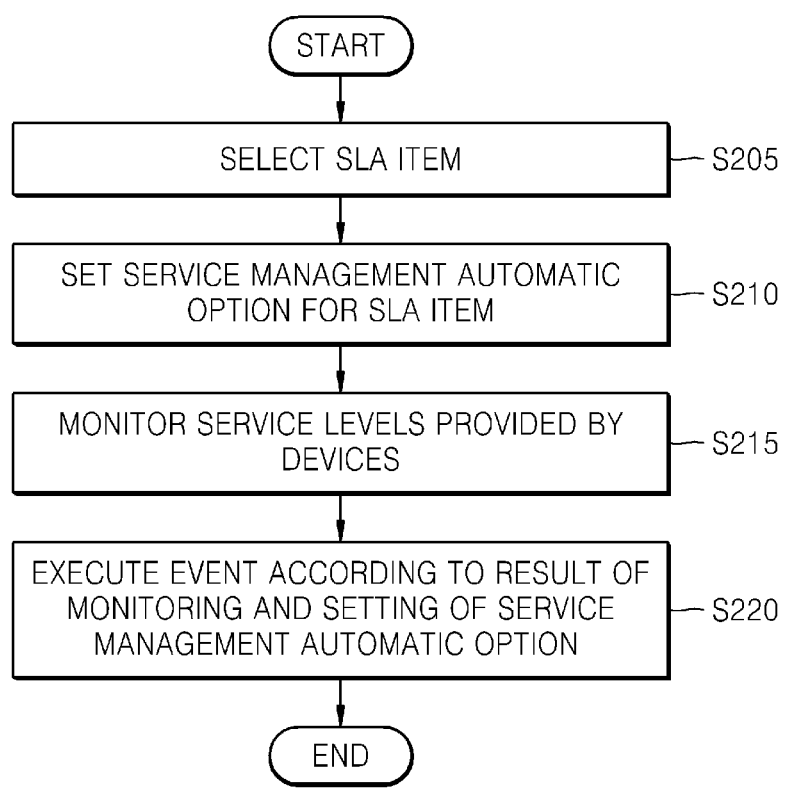
FIG. 2 is a flowchart illustrating an SLA management method according to an exemplary embodiment of the present general inventive concept.

FIG. 2 is a flowchart illustrating an SLA management method according to an exemplary embodiment of the present general inventive concept. Referring to FIG. 2 and FIG. 6, the SLM server 600a or 600b selects at least one SLA item to quantitatively measure service levels provided by devices, such as the image forming apparatuses 140, as illustrated in FIG. 1 (S205). SLA management software installed on the SLM server 600a or 600b provides a user with a graphic user interface (GUI) to output a list of SLA items. The SLM server 600a or 600b selects at least one SLA item from the SLA item list. The SLA items may include the management of firmware in each device, a driver to drive each device, consumables such as toner and paper of each device, and SLA management software installed on the SLM server 600a or 600b. The above SLA items are listed for convenience of explanation and an SLA item may be diversely changed according to a contract between a service vendor and a customer.

The SLM server 600a or 600b sets a service management automatic option with respect to a selected SLA item (S210). The service management automatic option may include an automatic management mode, a semiautomatic management mode, and a manual management mode. The SLM server 600a or 600b sets any one of the automatic management mode, the semiautomatic management mode, and the manual management mode, for an SLA item selected based on a user input.

In the automatic management mode, when a service error occurs on a selected SLA item while the SLM server 600a or 600b monitors the devices, the SLM server 600a or 600b automatically performs an event to fix the service trouble without a user command. The detailed content on the performance of an event will be described later. In the manual management mode, when a service error occurs on a selected SLA item while the SLM server 600a or 600b monitors the devices, the SLM server 600a or 600b continuously monitors the devices without performing an event to fix the service error until a user inputs a command. However, in the manual management mode, the SLM server 600a or 600b may display that a service error occurs on the selected SLA item through a service analysis report indicating a current service level. In the semiautomatic management mode, when a service error occurs on a selected SLA item while the SLM server 600a or 600b monitors the devices, the SLM server 600a or 600b compares a predetermined service level and a monitored service level. The predetermined service level and the monitored service level are values calculated as quantitative numbers by a statistical analysis method.

As a result of the comparison, if the monitored service level is equal to or greater than a predetermined service level, the SLM server 600a or 600b operates in the manual management mode. Otherwise, if the monitored service level is less than the predetermined service level, the SLM server 600a or 600b operates in the automatic management mode.

Figure 12:
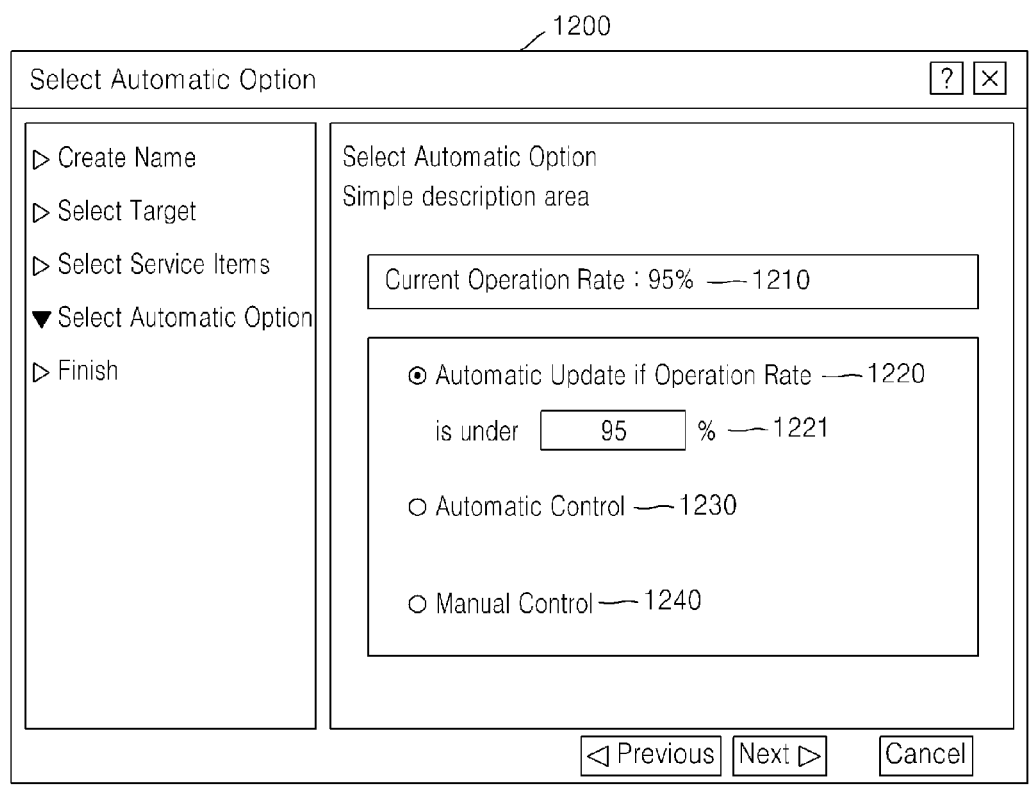

FIG. 12 illustrates a GUI 1200 to set a service management automatic option. When a user selects a semiautomatic management mode 1220, the user may directly input a predetermined service level through an input box 1221. A current operation rate 1210 denotes a target service level set on the SLM server 600*a* or 600*b*. The current operation rate 1210 may be directly input by a user through the input box 1310 a GUI 1300 of FIG. 13. A detailed content of the target service level will be described later. Further, the user may choose to select a fully automatic control 1230 (a.k.a., a set service management automatic option) or a fully manual control 1240 (a.k.a., a manual management mode).

The SLM server 600*a* or 600*b* monitors service levels provided by the devices with respect to a selected SLA item (S215). The SLM server 600*a* or 600*b* may periodically receive data about services currently provided by the devices, through a network. SLA management software installed on the SLM server 600*a* or 600*b* includes an observer module 720 of FIG. 7. The observer module 720 requests and receives the data about services currently provided by the devices, in a polling method. The observer module 720 may request and receive all data about the services, from the devices. According to another exemplary embodiment, the observer module 720 may request and receive only data corresponding to the selected SLA item of the services. When a device where a service error occurs with respect to the selected SLA item exists, the observer module 720 may receive error type information indicating the reason for the service error.

The SLM server 600*a* or 600*b* may statistically analyze a result of the monitoring and provided a user with an analysis report on the service levels provided by the devices. In other words, the SLM server 600*a* or 600*b* may accumulate the monitoring results from the past to the present, calculate an average value of each of service levels, and provide a user with a service analysis report. The SLM server 600*a* or 600*b* may compare a preset target service level and an analyzed service level with respect to the selected SLA item. If the analyzed service level is lower than the preset target service level, the SLM server 600*a* or 600*b* may output a warning message.

The SLM server 600*a* or 600*b* performs a predetermined event to control the devices according to the monitoring result and the service management automatic option setting (S220). In other words, the SLM server 600*a* or 600*b* detects that a service error occurs on the selected SLA item as a result of monitoring and performs a predetermined event to fix the service error. The predetermined event signifies an event corresponding to the error type information. The SLM server 600*a* or 600*b* stores an error management policy in which the error type information and an event corresponding thereto are mapped with each other. When the service error is detected, the SLM server 600*a* or 600*b* performs an event corresponding to the error type information by referring to the stored error management policy. The event is a process defined to recover a service error occurring on a device by controlling the devices. For example, when firmware that is currently installed on a device malfunctions, the SLM server 600*a* or 600*b* may check a version of the firmware and update the firmware to the latest version. If the firmware is already the latest version, the SLM server 600*a* or 600*b* may reinstall the firmware or reboot the device.

The event performed by the SLM server 600*a* or 600*b* may include updating firmware of each device, updating a driver of each device, rebooting of each device, and updating SLA management installed on the SLM server 600*a* or 600*b*. The event to be performed may be diversely modified according to embodiments. For example, a message including the error type information may be transmitted to a service vendor.

When a service error does not occur on the selected SLA item as a result of the monitoring, the SLM server 600*a* or 600*b* continues the monitoring.

Otherwise, when a service error occurs on the selected SLA item as a result of the monitoring, the SLM server 600*a* or 600*b* refers to the set service management automatic option. When the automatic management mode is set, the SLM server 600*a* or 600*b* automatically performs an event corresponding to the error type information without a user command. When the semiautomatic management mode is set, the SLM server 600*a* or 600*b* compares the predetermined service level and the monitoring result. If the service levels provided by the devices are lower than the predetermined service level, an event corresponding to the error type information is automatically performed. However, if the service levels provided by the devices are equal to or higher than the predetermined service level, the SLM server 600*a* or 600*b* continues the monitoring and does not perform an event until a user command is received. The predetermined service level in the semiautomatic management mode may be a certain value set by a user of the SLM server 600*a* or 600*b* or a service level agreed between a service vendor and a customer. When the manual management mode is set, the SLM server 600*a* or 600*b* continues the monitoring and waits until a user command is received.

Figure 3:
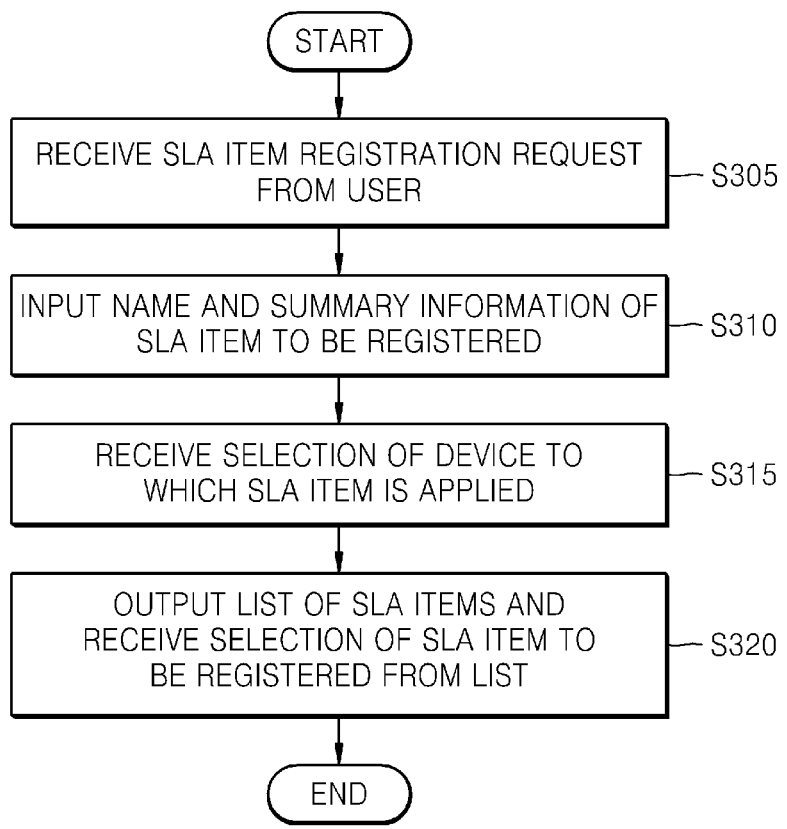
FIG. 3 is a flowchart illustrating a process of registering an SLA item, according to an exemplary embodiment of the present general inventive concept.

FIG. 3 is a flowchart illustrating a process of registering an SLA item, according to an exemplary embodiment of the present general inventive concept. Operation S205 of FIG. 2 denotes a process of registering an SLA item. The SLM server 600*a* or 600*b* may manage only registered SLA items among the overall SLA items. Thus, the SLM server 600*a* or 600*b* selects an SLA item subject to a management and registers the selected SLA item as a management target via SLA management software.

Figure 14:
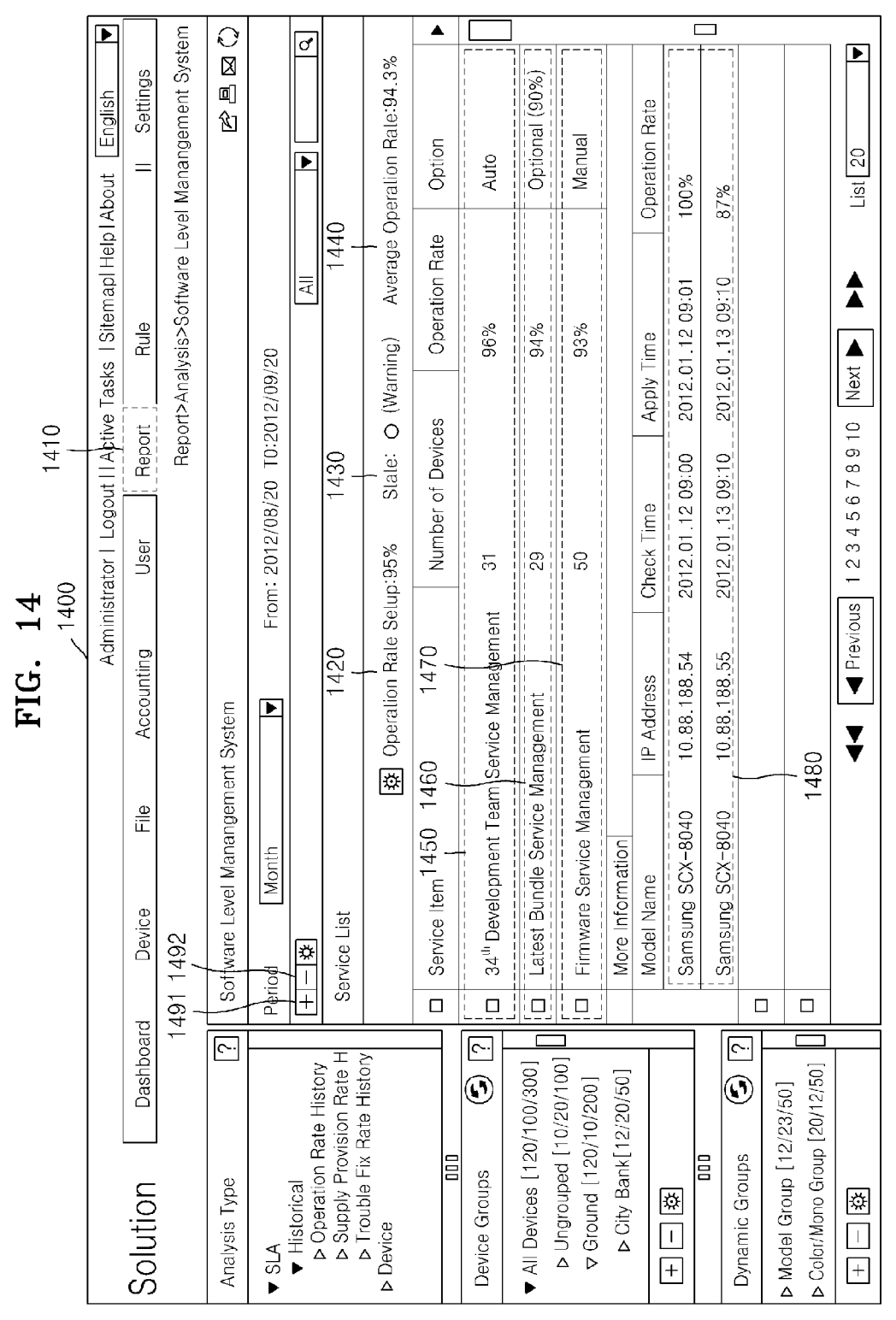

Referring to FIG. 3, the SLM server 600*a* or 600*b* receives a request to register an SLA item from a user (S305). Referring to FIG. 14, which illustrates a GUI 1400, a "+" button 1491 registers an SLA item and a "−" button 1492 deletes an SLA item. SLA items 1450, 1460, and 1470 indicate SLA items that are currently registered on the SLM server 600*a* or 600*b*. A user may request registration of an SLA item on the SLM server 600*a* or 600*b* by using the "+" button 1491. Thus, the SLM server 600*a* or 600*b* may dynamically manage the SLA items by registering or deleting the SLA items.

Figure 9:
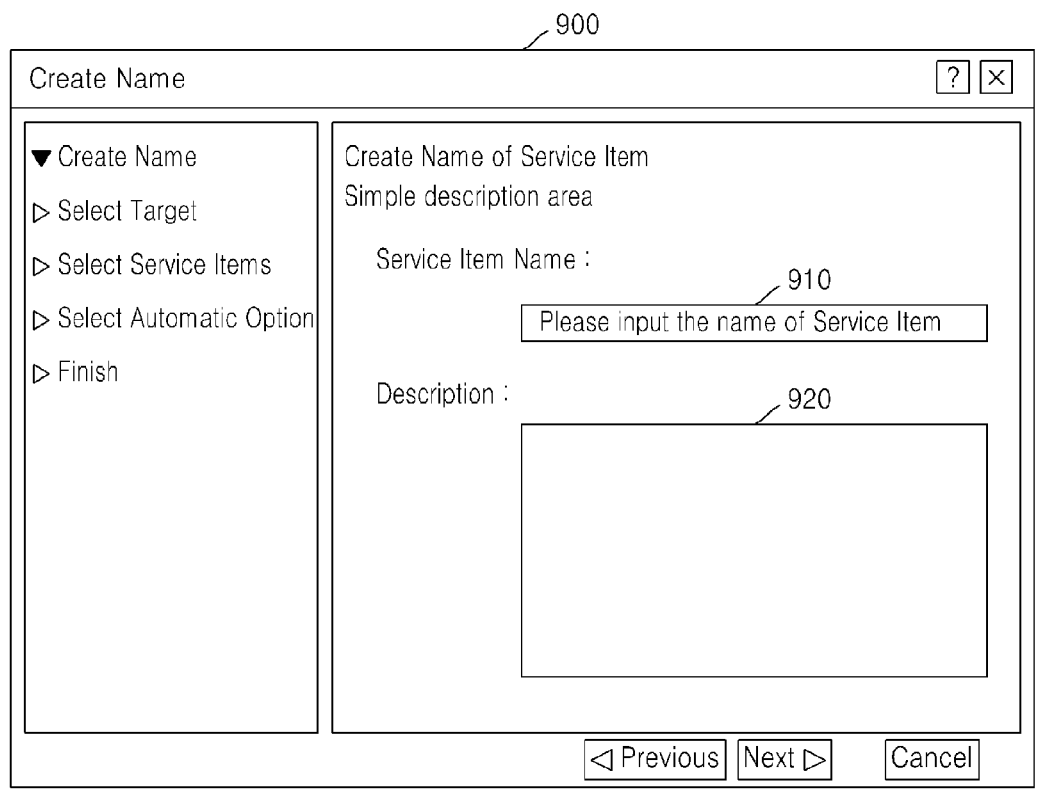

The SLM server 600*a* or 600*b* receives an input of a representative name and summary information of an SLA item to be registered, from a user (S310). The SLM server 600*a* or 600*b* generates a GUI 900 of FIG. 9 and provides the generated GUI 900 to a user. The GUI 900 includes an SLA item representative name input box 910 and a summary information input box 920. When a plurality of SLA items are registered and managed as a group, a user inputs a representative name of an SLA item group in the SLA item representative name input box 910. A description about the SLA items to be registered may be input in the summary information input box 920.

Figure 10:
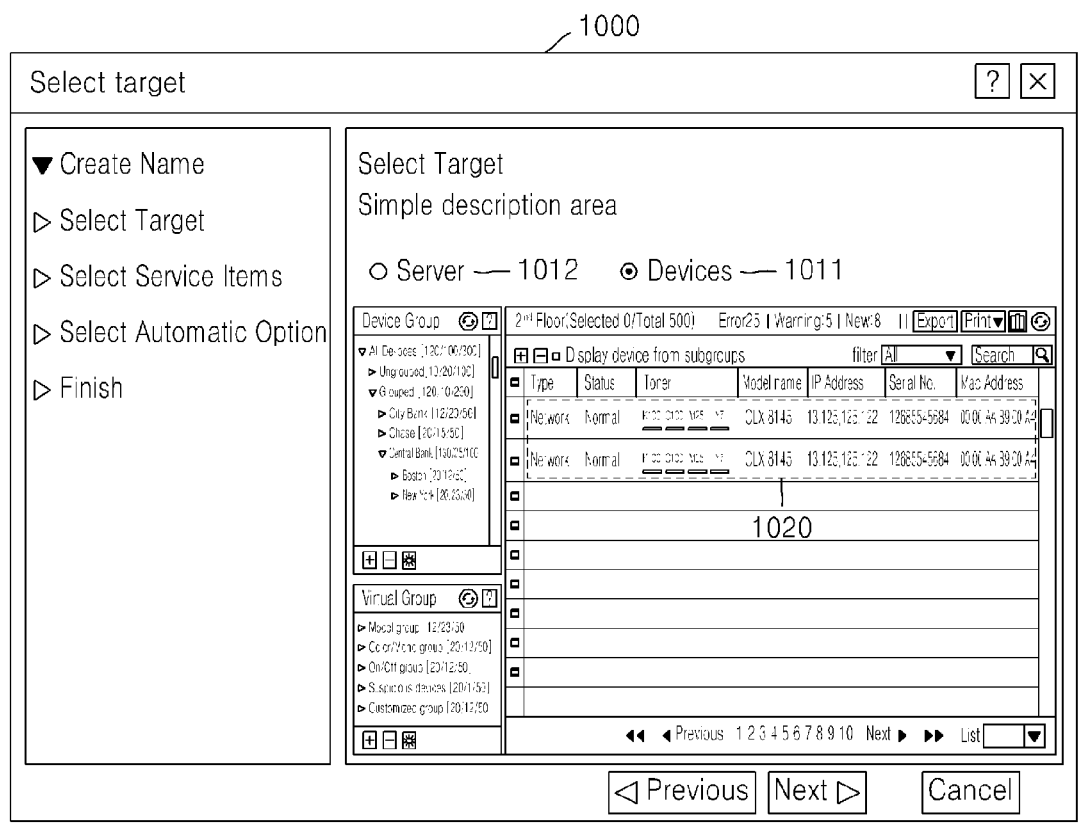

The SLM server 600*a* or 600*b* receives a selection of at least one device to which the SLA item to be registered is applied, of the devices (S315). The SLM server 600*a* or 600*b* generates a GUI 1000 of FIG. 10 and provides the generated GUI 1000 to a user. Referring to FIG. 10, the GUI 1000 includes a server button 1012 and a device button 1011. When the SLM server 600*a* or 600*b* is the main server 110 of FIG. 1, a list of the branch servers 120 and 130 is output by selecting the server button 1012. When the device button 1011 is selected, a device list 1020 is output. If a user selects a plurality of devices from the device list 1020, the selected devices are managed as one group. Alternatively, the devices are grouped in advance and a list of devices in the group may be output.

Figure 11:
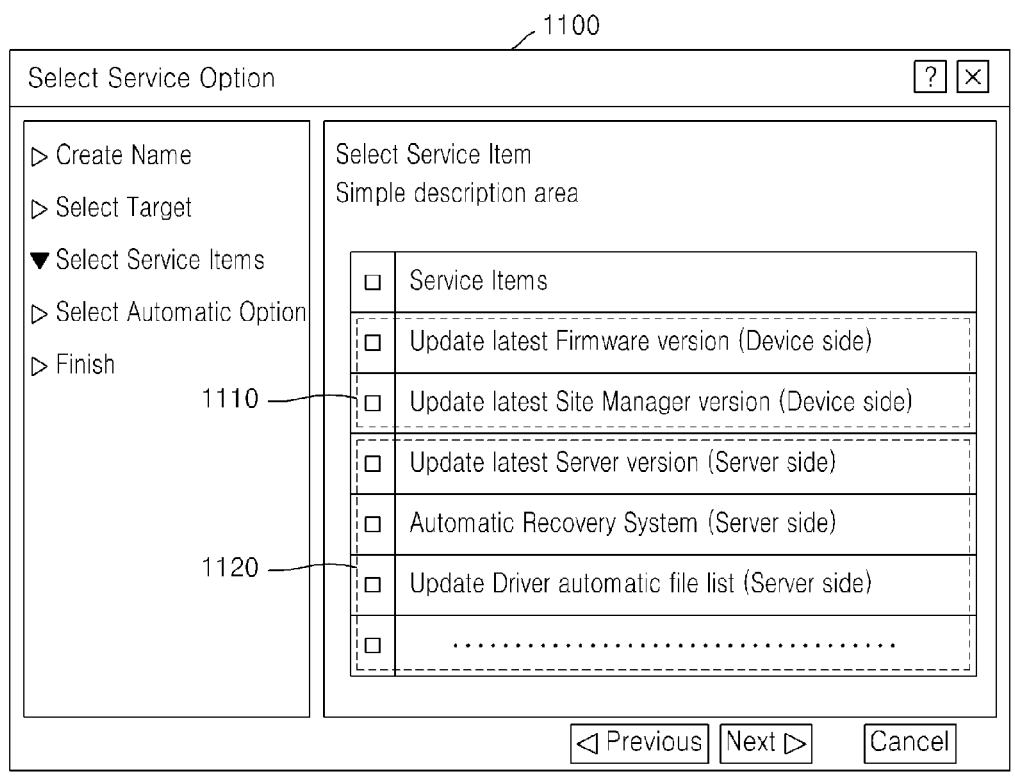

Next, the SLM server 600a or 600b outputs a list of total SLA items and receives a selection of SLA items to be registered from the list (S320). The SLM server 600a or 600b generates a GUI 1100 of FIG. 11 and provides the generated GUI 1100 to a user. Referring to FIG. 11, lists 1110 and 1120 of SLA items are output. The SLA items illustrated in FIG. 11 are exemplary and the present general inventive concept is not limited thereto. The list 1110 indicates the SLA items with respect to the devices and the list 1120 indicates the SLA items with respect to other SLM servers, such as the branch servers 120 and 130. For example, when the SLM server 600a or 600b is the main server 110 of FIG. 1, the list 1120 indicates the SLA items with respect to the branch servers 120 and 130. In operation S315, since a user selected the device button 1011, the list 1120 may be either omitted or inactivated not to be selected.

Figure 4:
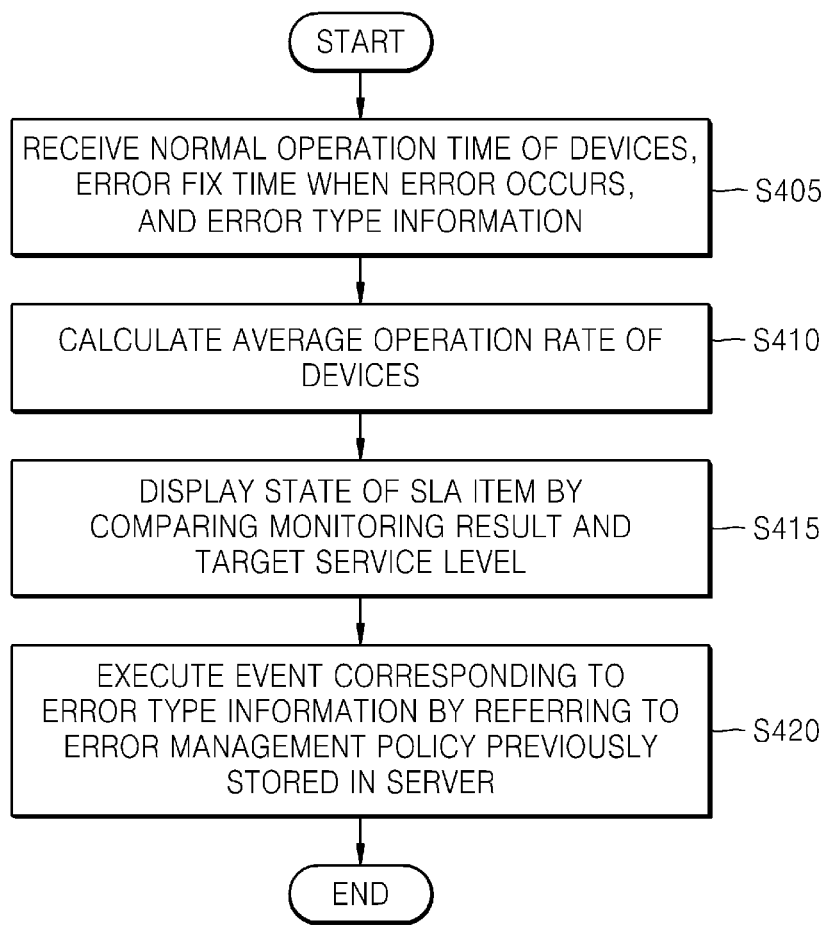
FIG. 4 is a flowchart illustrating a process of managing an average operation rate of devices, exemplary embodiment of the present general inventive concept.

FIG. 4 is a flowchart illustrating a process of managing an average operation rate of devices, according to an exemplary embodiment of the present general inventive concept.

An operation rate of a device may be calculated by using a normal operation time and an error fix time as illustrated in Equation 1.

$$\text{operation rate} = \frac{\text{operation time}}{\text{operation time} + \text{error fix time}} \quad [\text{Equation 1}]$$

The normal operation time denotes a time during which a device is normally operated with respect to a selected SLA item without service error. The error fix time denotes a time from service error occurs with respect to a selected SLA item to the service error is fixed. When a plurality of SLA items are selected, the normal operation time denotes a time during which a device is normally operated with respect to the selected SLA items without service error.

The average operation time of devices denotes an average value of the operation rates of the devices. When a selected SLA item is applied to a plurality of devices, an operation rate of each device is calculated and an average of the calculated operation rates of the devices is calculated, thereby obtaining an average operation rate of devices.

The SLM server 600a or 600b receives the normal operation time of the devices to which the selected SLA item in the monitoring operation (S215) is applied, and the time consumed to fix a service error occurring on the selected SLA item, from each device (S405). The SLM server 600a or 600b may receive the above-described error type information.

The SLM server 600a or 600b calculates an average operation rate of devices by using the normal operation time and the error fix time (S410). The SLM server 600a or 600b calculates an average operation rate by using the normal operation time and the error fix time accumulated from the past, with the last received normal operation time and error fix time. Equation 1 may be referred to by a method of calculating an average operation rate.

Figure 13:
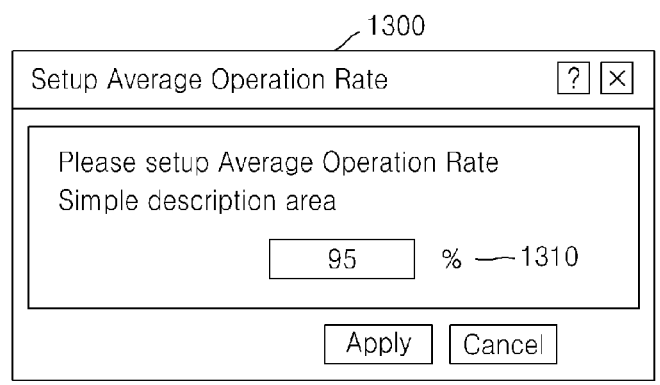

The SLM server 600a or 600b displays a state of the SLA item by comparing a monitoring result and a target service level (S415). The following description is based on an assumption that the monitoring result is an average operation rate of devices calculated in S410. The target service level denotes a target value set to a service level of a selected SLA item. The target service level is one reference value and may be input directly by a user as illustrated in FIG. 13. The state of an SLA item may include a normal state or a warning state. Although the state of an SLA item is described in two ways in the current embodiment of the present general inventive concept, the state of an SLA item may be described in greater classification number N (N>2).

Referring to FIG. 14, when a user selects a report menu 1410, the SLM server 600a or 600b statistically analyzes the monitoring result and provides the user with a service analysis report with respect to a service level provided by devices. In the SLM server 600a or 600b, an operation rate 1420 set as the target service level is set to be 95%. Also, according to the monitoring result, the average operation rate 1440 is calculated to be 94.3%. The SLM server 600a or 600b compares the set operation rate 1420 and the calculated average operation rate 1440 and displays an SLA item state 1430 as a warning state.

In FIG. 14, a "34$^{th}$ Development Team Service Management" 1450, a "Latest Bundle Service Management" 1460, and a "Firmware Service Management" 1470 displayed as service items that are representative names of SLA items input in S310 of FIG. 3. The service items 1450, 1460, and 1470 are respectively set to an automatic management mode, a semiautomatic management mode, and a manual management mode. When any one of the service items 1450 to 1470 is selected, a list of devices and an operation rate of each device are displayed on a box 1480.

The SLM server 600a or 600b referring to the error policy management executes an event corresponding to the error type information (S420). When a service error occurs in the 34$^{th}$ Development Team Service Management 1450 that is set to the automatic management mode, the SLM server 600a or 600b referring to the error policy management executes an event corresponding to the error type information received in S405. When service error occurs in the Latest Bundle Service Management 1460 that is set to the semiautomatic management mode, the SLM server 600a or 600b determines whether to execute the event by comparing the operation rate of 94% of the Latest Bundle Service Management 1460 and the service level set value of 90% for the semiautomatic management mode. For the Firmware Service Management 1470 set to the manual management mode, the SLM server 600a or 600b does not execute the event and waits until there is a command by a user.

Figure 5:
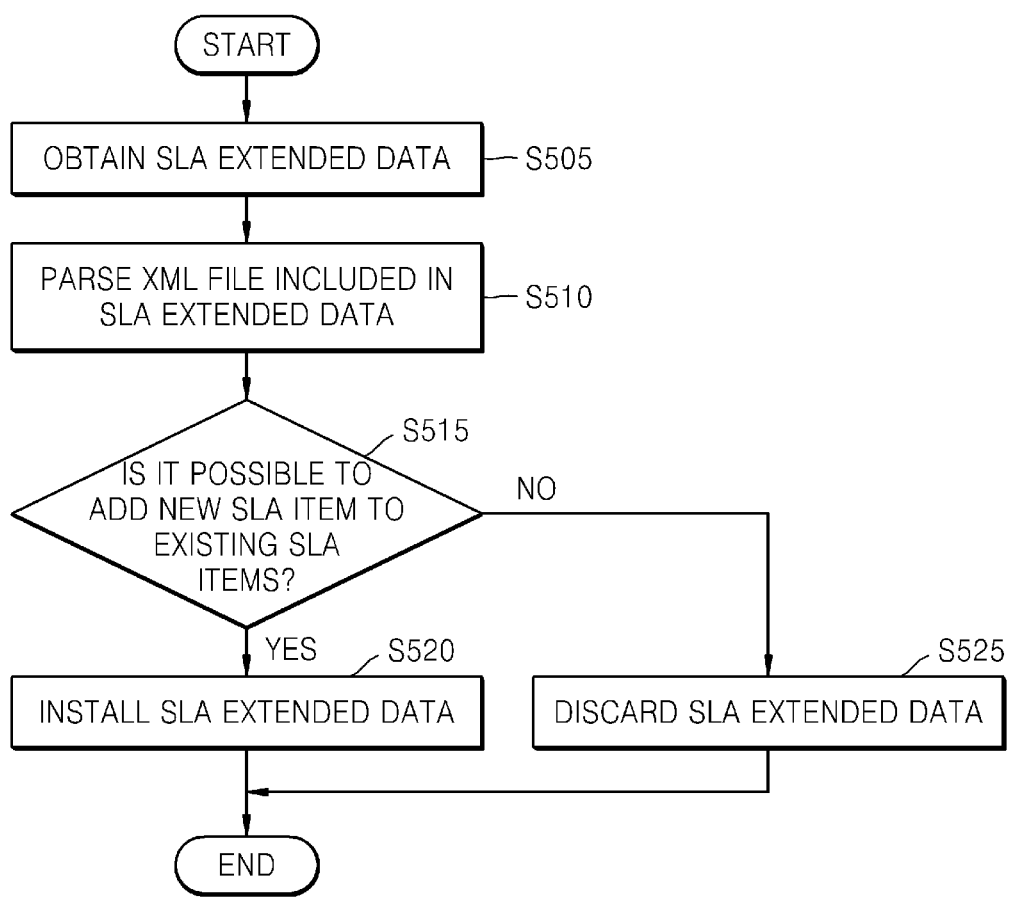
FIG. 5 is a flowchart illustrating a process of adding a new SLA item, according to an exemplary embodiment of the present general inventive concept.

FIG. 5 is a flowchart illustrating a process of adding a new SLA item, according to an exemplary embodiment of the present general inventive concept. It is possible to add new SLA items later to the SLA management software installed on the SLM server 600a or 600b. Accordingly, if a contract between a service vendor and a customer is revised, the SLM server 600a or 600b may reflect a revised contract by adding new SLA items to the previously installed SLA management software.

The SLA management software is operated based on an open type framework open services gateway initiative (OSGi). The SLA items may be exposed to OSGi as a bundle or imported from the outside.

Referring to FIG. 5, the SLM server 600a or 600b obtains SLA extended data (S505). The SLM server 600a or 600b may obtain SLA extended data via an external input port, for example, a USB port or optical disc input port, or download SLA extended data through a network.

The SLM server 600a or 600b parses an extensible markup language (XML) file included in the SLA extended data (S510). The XML file includes information about new SLA items included in the SLA extended data. The information about new SLA items may include, for example, information about the type of a user interface (UI), information about a position where UIs of the new SLA items are displayed, with respect to the UIs of the existing SLA items, and information about a method of displaying service levels of the new SLA items. The information about the UI is indicated in the XML file.

The SLM server 600a or 600b determines whether a new SLA item may be added to the existing SLA items based on a parsed XML file (S515). For example, the SLM server 600a or 600b determines whether UIs of new SLA items may be actually extended with respect to the existing SLA items by using the information about a position where the UIs of the new SLA items are displayed.

If the addition of new SLA items is possible, the SLM server 600a or 600b installs SLA extended data (S520). The SLM server 600a or 600b updates the UI of the SLA management software by adding UI of the new SLA item to the UI of the existing SLA items.

Otherwise, if the addition of new SLA items is not possible, the SLM server 600a or 600b does not install the SLA extended data (S525). At this time, the SLM server 600a or 600b may discard of the SLA extended data.

Figure 6A:
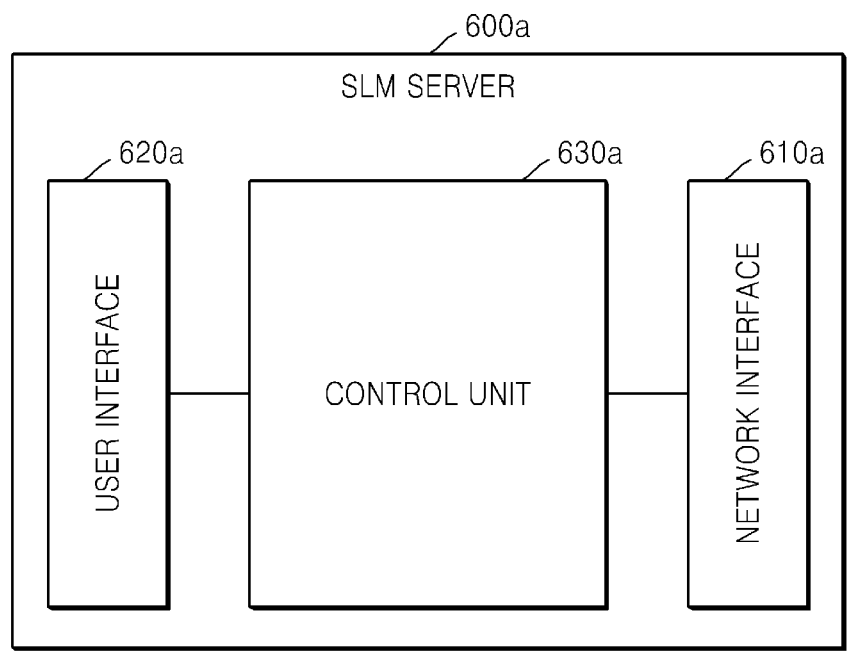
FIGS. 6A and 6B are block diagrams schematically illustrating an SLM server, according to an exemplary embodiment of the present general inventive concept.
Figure 6B:
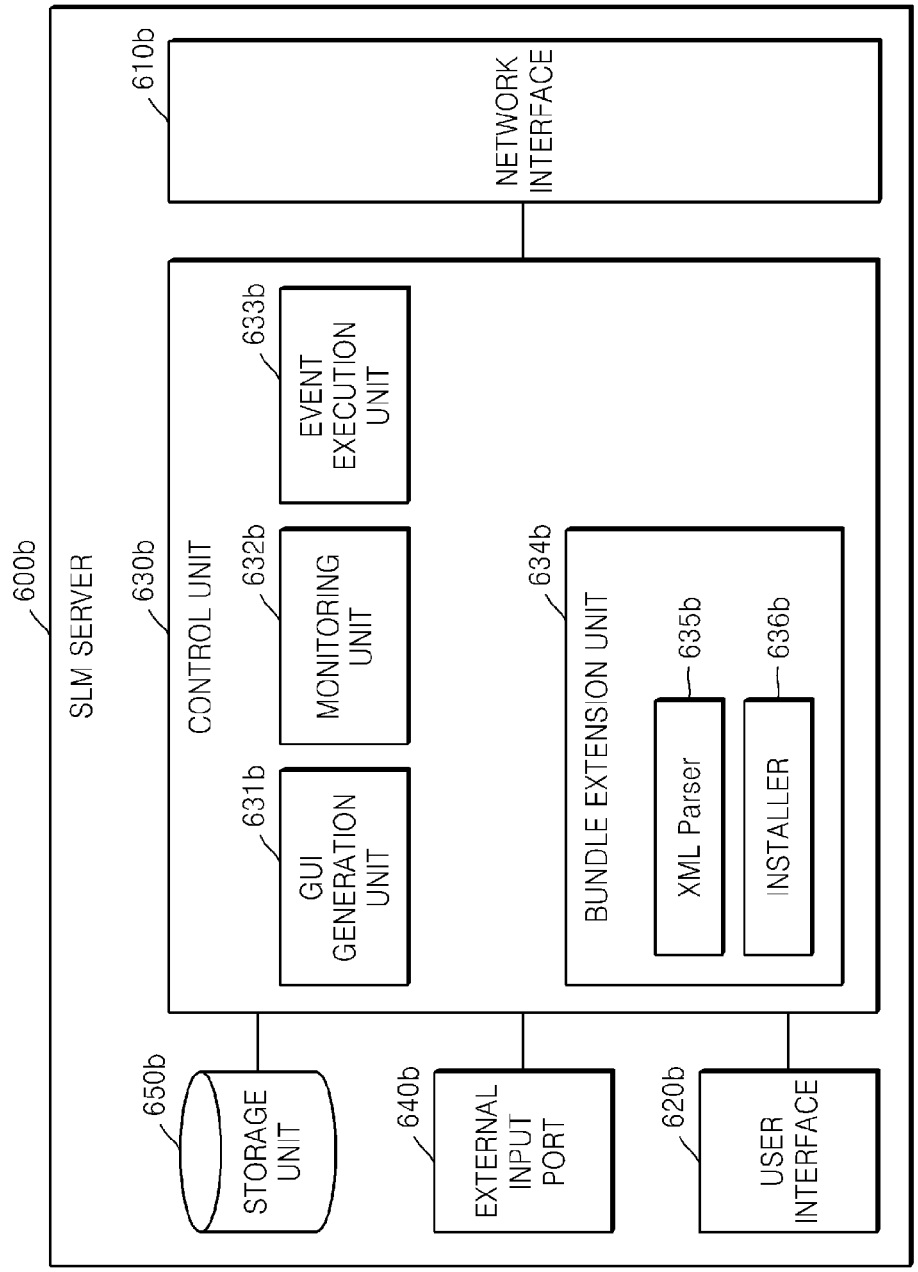

FIGS. 6A and 6B are block diagrams schematically illustrating the SLM servers 600a and 600b respectively, according to an exemplary embodiment of the present general inventive concept. Descriptions that are identical to those of FIGS. 1-5 are omitted herein. Accordingly, the embodiments of FIGS. 1-5 may be referred to by embodiments of the SLM servers 600a and 600b of FIGS. 6A and 6B.

Referring to FIG. 6A, the SLM server 600a includes a user interface 620a, a control unit 630a, and a network interface 610a. The network interface 610a as a unit to connect to a network transmits and receives data with respect to devices, such as the image forming apparatuses 140, according to wired or wireless communication specifications.

The user interface 620a denotes an input/output (I/O) interface to receive a user manipulation input or to provide a result of the user manipulation to a user. For example, the user interface 620a may be an interface for input/output (I/O) of a human interface device (HID). The user interface 620a receives a selection of at least one SLA item to quantitatively measure a service level provided by the devices and receives an input of setting a target service level and a service management automatic option of a selected SLA item.

The control unit 630a monitors the service level provided by the devices with respect to the selected SLA item and executes a predetermined event to control the devices according to a monitoring result and the service management automatic option setting. In other words, the control unit 630a executes the SLA management software installed on the SLM server 600a or 600b, thereby performing the monitoring and the event.

FIG. 6B illustrates the SLM server 600a of FIG. 6A in detail. Referring to FIG. 6B, the SLM server 600b includes a network interface 610b, a user interface 620b, a control unit 630b, an external input port 640b, and a storage unit 650b. FIG. 6A may be referred to for a description about the network interface 610b.

When a user requests registration of an SLA item, the user interface 620b receives via a GUI an input of a representative name and summary information of an SLA item to be registered. Next, the user interface 620b receives a selection of at least one of the devices to which the SLA item to be registered is applied. The user interface 620b outputs a list of SLA items and receives a selection of an SLA item to be registered from the list.

A GUI generation unit 631b generates a GUI to be output through the user interface 620b. In other words, a GUI is generated by SLA software. FIGS. 8-14 illustrate GUIs generated by the GUI generation unit 631b.

A monitoring unit 632b monitors a service level provided by the devices with respect to a selected SLA items through the user interface 620b. The monitoring unit 632b receives a normal operation time of each device through the network interface 610b. Also, when an error occurs on the selected SLA item, the monitoring unit 632b may receive the time consumed to fix the error or error type information. When an error occurs, the monitoring unit 632b requests an event execution unit 633b to execute an event corresponding to the error type information.

The monitoring unit 632b calculates an average operation rate of the devices based on the normal operation time and the error fix time. Equation 1 may be referred to by a method of calculating an operation rate of a device.

The monitoring unit 632b indicates the selected SLA item in a warning state or a normal state by comparing the monitoring result and a preset target service level. In other words, when a user selects the report 1410 of FIG. 14, the monitoring unit 632b generates a service analysis report. The service analysis report includes a state of an SLA item.

The storage unit 650b stores SLA management software and set values for the SLA management software. The storage unit 650b stores error type information an error management policy mapped with events corresponding thereto.

The event execution unit 633b executes an event to control the devices according to the monitoring result and the service management automatic option setting. When the monitoring unit 632b requests execution of an event, the event execution unit 633b, referring to the error management policy stored in the storage unit 650b, executes an event corresponding to the error type information. For example, the event execution unit 633b executes a device firmware update event, a device driver update event, a device rebooting event, and an SLA management software update event.

The external input port 640b as a device to communicate data with an external apparatus may be, for example, a USB input port or an optical disc reproduction and recording apparatus. The external input port 640b obtains SLA extended data to add a new SLA item to the existing SLA items.

A bundle extension unit 634b installs SLA extension data obtained through the external input port 640. An XML parser 635b parses a predetermined XML file included in the SLA extended data. An installer 636b determines whether a new SLA item may be added to the existing SLA items based on a parsed XML file and installs SLA extended data according to a result of the determination.

Figure 7:
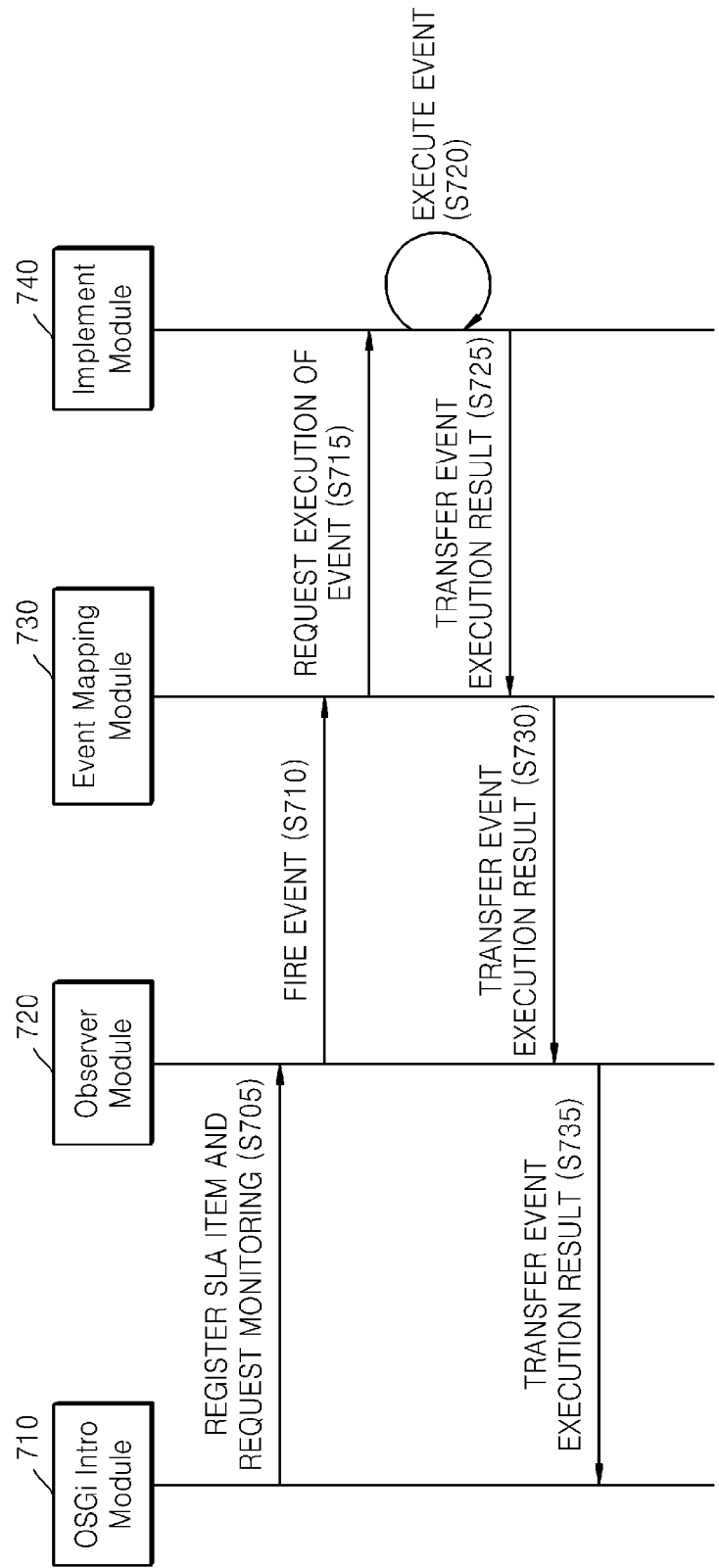
FIG. 7 is a sequence diagram of SLA management software, according to an exemplary embodiment of the present general inventive concept.

FIG. 7 is a sequence diagram of SLA management software, according to an exemplary embodiment of the present general inventive concept.

The SLA management software according to the present embodiment is operated based on an OSGi open type framework and includes an OSGi intro module 710, an observer module 720, an event mapping module 730, and an implement module 740. The OSGi intro module 710 performs registration of an SLA item in FIG. 3. The observer module 720 monitors a service level provided by the devices. When the observer module 720 fires an event, the event mapping module 730 requests the implement module 740 to execute an event corresponding to error type information by referring to an error management policy. The implement module 740 that is a module to execute a requested event may be, for example, a firmware update module, a driver update module, and an SLA management software update module.

The OSGi intro module 710 selects and registers an SLA item and requests monitoring from the observer module 720 (S705). The observer module 720 periodically monitors the devices with respect to a selected SLA item and fires an event when a service error occurs (S710). The observer module 720 may transfer to the event mapping module 730 error type information indicating cause of the service error and information about a device where the service error occurs.

The event mapping module 730, referring to the error management policy, determines what job is to be done with respect to a fired event. In other words, the event mapping module 730, referring to the error management policy, requests the implement module 740 to execute an event corresponding to the error type information.

The implement module 740 executes an event (S720). A result of the execution of an event may be stored in the SLM server 600a or 600b. The implement module 740 transfers an event execution result to the event mapping module 730 (S730). If the service error is not fixed as a result of the execution of an event, the event mapping module 730, referring to the error management policy, may request the implement module 740 to execute another event.

The event mapping module 730 transfers a received event execution result to the observer module 720. If the service error is not fixed as a result of the execution of an event, the observer module 720 may fire the same event again or cancel the firing of an event. If the event is fired again, other error type information may be transferred to the event mapping module 730.

The observer module 720 transfers a received event execution result to the OSGi intro module 710 (S735).

Figure 8:
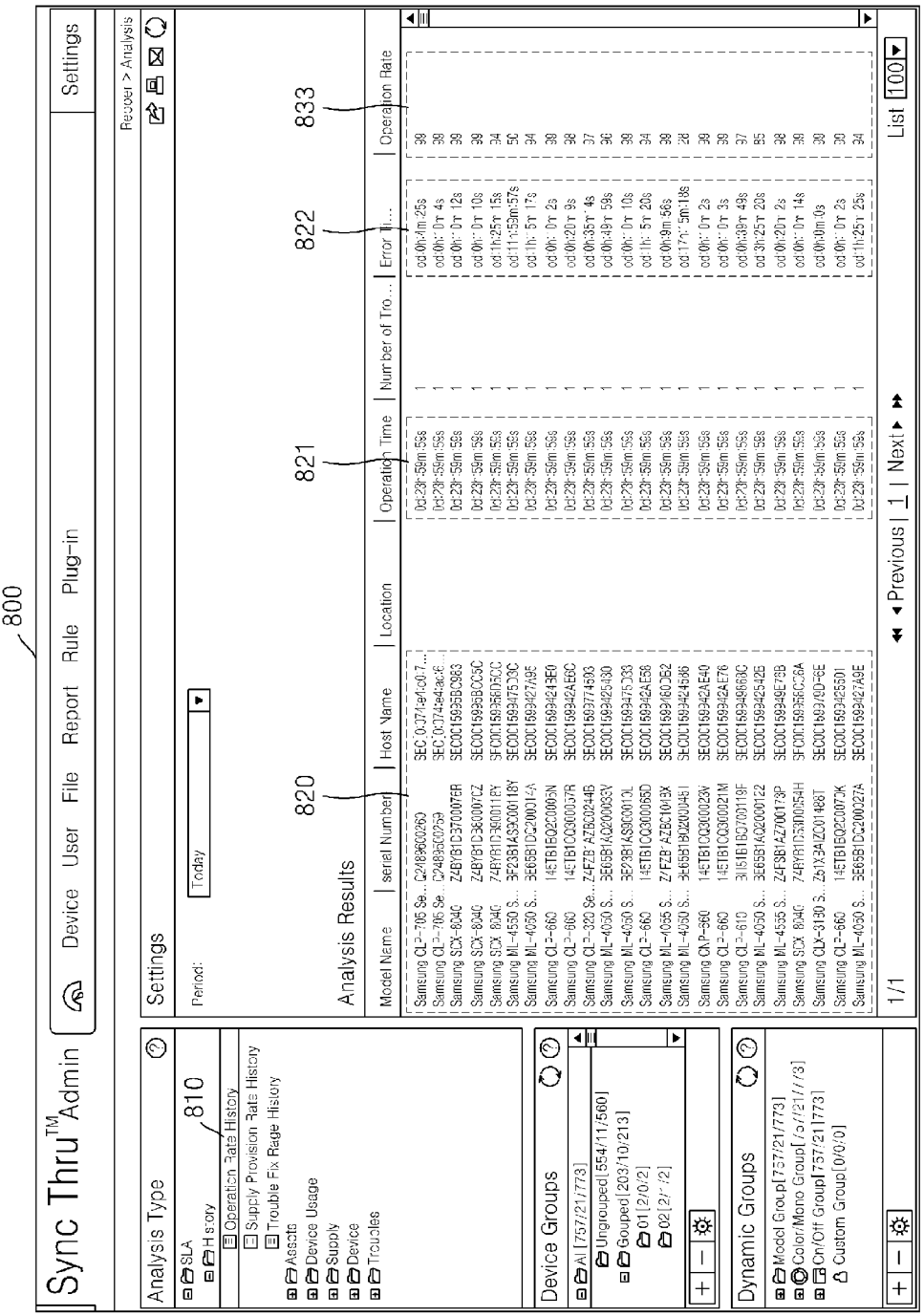

FIG. 8 illustrates a GUI 800 generated by the GUI generation unit 631b, according to an exemplary embodiment of the present general inventive concept. A user may select an operation rate history 810 in order to view information corresponding to the devices and their respective operation times and errors. For example, device model names, serial numbers, and host names may be displayed in a device identifying box 820. An operation time box 821 mat display operation times of each of the corresponding devices. Further, an error time box 822 may display a time during which an error occurred during operation of each of the devices.

As described above, according to the present general inventive concept, since necessary action is automatically taken on an SLA item having an error while a server monitors SLA, an immediate response is possible to be provided. Also, since a customer or a service vendor can change an SLA item, SLA items may be flexibly managed.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While this invention has been particularly shown and described with reference to exemplary embodiments thereof, it will be understood by those skilled in the art that various changes in form and details may be made therein without departing from the spirit and scope of the general inventive concept as defined by the appended claims and their equivalents.

What is claimed is:

1. A method of managing, via a server including a Graphical User Interface (GUI) and an external port, a service level agreement (SLA) including at least one SLA item with respect to an image forming apparatus connected to the server on a network, the method comprising:
by the server:
generating a GUI to receive a user input to register at least one of a plurality of SLA items of the image forming apparatus and to list the registered SLA items;
setting a service management option with respect to a selected at least one of the registered SLA items listed in the generated GUI to measure a service level including error type information provided by the image forming apparatus to the server through the external port based on input by a user received at the generated GUI, wherein the setting the service management option with respect to the selected SLA item comprises setting one of:
an automatic management mode in which the server automatically performs a predetermined event, the predetermined event corresponding to error information of an error management policy, regardless of a monitored service level of the image forming apparatus,
a semiautomatic management mode in which the server automatically performs the predetermined event only when the monitored service level of the image forming apparatus is determined as less than a predetermined service level, and
a manual management mode in which the server performs the predetermined event only after receiving another input by the user;
monitoring the service level provided by the image forming apparatus of the selected SLA item and error information indicating a cause of an error upon the error occurring on the image forming apparatus; and
performing the predetermined event based on the monitored service level, the error information, and the set service management mode,
the method further comprising:
adding a new SLA item to the plurality of SLA items by:
obtaining SLA extended data,
determining whether the GUI may be modified with respect to the plurality of SLA items, and
installing the obtained SLA extended data on the server, upon determining the GUI may be modified.

2. The method of claim 1, wherein the monitoring of the service level comprises:
   receiving a normal operation time of the image forming apparatus and an error fix time to fix an error occurring on the selected at least one of the registered SLA items, and
   calculating an average operation rate of the image forming apparatus based on the normal operation time and the error fix time.

3. The method of claim 1, further comprising setting a target service level based on an input by the user through the GUI.

4. The method of claim 3, wherein, the monitoring of the service level comprises comparing a result of the monitoring with the set target service level and indicating that the selected at least one of the registered SLA items is in a warning state or a normal state.

5. The method of claim 1, wherein the installing the obtained SLA extended data comprises:
   parsing a predetermined extensible markup language (XML) file included in the obtained SLA extended data;
   determining whether the GUI may be modified with respect to the existing plurality of SLA items to include the new SLA item based on the parsed predetermined XML file; and
   installing the obtained SLA extended data according to a result of the determination.

6. The method of claim 1, wherein
   the plurality of SLA items each comprise at least one of a device firmware management item, a device driver management item, a device consumables management item, and a server software management item.

7. The method of claim 1, wherein, during the performing of the predetermined event, at least one of the following is executed: a device firmware update event, a device driver update event, a device rebooting event, and a server software update event.

8. The method of claim 1, wherein the setting the service management option comprises:
   receiving an input of a representative name and summary information of the SLA item to be registered via the GUI;
   receiving a selection of the image forming apparatus to which the SLA item to be registered is applied; and
   outputting a list of the SLA items and receiving a selection, from the list, of the SLA item to be registered.

9. A non-transitory computer-readable recording medium having recorded thereon a program to execute the method of claim 1.

10. A server to manage a service level agreement (SLA) including at least one SLA item with respect to an image forming apparatus on a network, the server comprising:
    a display configured to display at least one Graphical User Interface (GUI) to receive an input of a user of the server;
    an external port to communicate with the image forming apparatus on the network; and
    at least one hardware processor configured to:
      connect to the network through the external port of the server using a network interface to communicate with the image forming apparatus,
      generate the GUI to receive a user input to register at least one of a plurality of SLA items of the image forming apparatus and to list the registered SLA items,
      set a service management option with respect to a selected at least one of the registered SLA items listed in the generated GUI to measure a service level including error type information provided by the image forming apparatus to the server through the external port based on input by a user received at the generated GUI, wherein the service management option comprises one of:
        an automatic management mode in which the server automatically performs a predetermined event, the predetermined event corresponding to error information of an error management policy regardless of a monitored service level of the image forming apparatus,
        a semiautomatic management mode in which the server automatically performs the predetermined event when the monitored service level of the image forming apparatus is determined as less than a predetermined service level, and
        a manual management mode in which the server performs the predetermined event only after receiving another input by the user,
      monitor the service level provided by the image forming apparatus through the external port with respect to the selected SLA item and error information indicating a cause of an error upon the error occurring on the image forming apparatus, and
      execute the predetermined based on the monitored service level, the error information, and the set service management mode, and
    wherein the at least one hardware processor add a new SLA item to the plurality of SLA items by:
      obtaining SLA extended data through the network interface or via an external input port provided in the server,
      determining whether the GUI may be modified with respect to the existing plurality of SLA items, and
      installing the obtained SLA extended data on the server, upon determining the GUI may be modified.

11. The server of claim 10, wherein the server receives a normal operation time of the image forming apparatus and an error fix time to fix an error occurring on the selected at least one of the registered SLA items and calculates an average operation rate of the image forming apparatus based on the normal operation time and the error fix time.

12. The server of claim 10, wherein the server compares a result of the monitoring and the target service level and indicates that the selected at least one of the registered SLA items is in a warning state or a normal state.

13. The server of claim 10, wherein the each of the plurality of SLA items comprise at least one of a device firmware management item, a device driver management item, a device consumables management item, and a server software management item.

14. The server of claim 10, wherein the at least one hardware processor is further configured to:
    parse a predetermined extensible markup language (XML) file included in the SLA extended data; and
    determine whether the GUI may be modified with respect to the existing plurality of SLA items to include the new SLA item based on the parsed predetermined XML file and installing the SLA extended data according to a result of the determination.

15. The server of claim 10, wherein the server executes at least one of a device firmware update event, a device driver update event, a device rebooting event, and a server software update event.

16. The server of claim 10, wherein a representative name and summary information of the at least one of a plurality of SLA items to be registered, and a selection of the image forming apparatus to which the registered SLA item to be registered is applied is inputtable by the user at the another GUI.

17. A server to manage a service level agreement (SLA) with respect to an image forming apparatus on a network, the server comprising:
a storage to store an error management policy;
a display configured to display at least one Graphical User Interface (GUI) including a plurality of SLA items to allow the user to register at least one of the plurality of SLA items of the image forming apparatus, select at least one SLA item from the registered plurality of SLA items to measure a service level provided by the image forming apparatus, preset a service management option, and input a target service level with respect to the selected SLA item and the preset service management option;
an external port to communicate with the image forming apparatus on the network; and
at least one hardware processor configured to:
connect to the network through the external port of the server using a network interface to communicate with the image forming apparatus,
generate the at least one GUI,
monitor a service level provided by the image forming apparatus through the external port with respect to the selected at least one SLA item, and
execute the preset service management option with respect to the selected at least one SLA item based on the input of the user of the server, wherein the service management option is one of an automatic management mode in which the server automatically performs a predetermined event, the predetermined event corresponding to their information of the error management policy, regardless of the monitored service level of the image forming apparatus, a semiautomatic management mode in which the server automatically performs the predetermined event when the monitored service level is less than a predetermined service level of the image forming apparatus, and a manual management mode,
execute the predetermined event based on the monitored service level, the error information, and the preset service management option,
execute the predetermined event by referring to the error management policy stored in the storage, wherein the predetermined event corresponds to error type information that indicates a cause of an error on the image forming apparatus,
wherein the at least one hardware processor add a new SLA item to the plurality of SLA items by:
obtaining SLA extended data through the network interface or via an external input port provided in the server,
determining whether the GUI may be modified with respect to the existing plurality of SLA items, and
installing the obtained SLA extended data on the server, upon determining the GUI may be modified.

18. The server of claim 17, wherein when the preset service management option is the semiautomatic management mode, the server compares the predetermined service level and the monitored service level, and automatically performs the predetermined event when the monitored service level provided by the image forming apparatus is lower than the predetermined service level, or does not perform the predetermined event until a command is received from the user when the service level provided by the image forming apparatus is equal to or higher than the predetermined service level.

19. The server of claim 17, wherein the at least one hardware processor executes at least one of a device firmware update event, a device driver update event, a device rebooting event, and an SLA management software update event.

* * * * *